May 26, 1931.  F. VAN VRANKEN  1,806,960
SAFETY THROTTLE CONTROL
Filed May 19, 1928

Inventor
Frank Van Vranken;
By Lyon & Lyon
Attorneys

Patented May 26, 1931

1,806,960

UNITED STATES PATENT OFFICE

FRANK VAN VRANKEN, OF LOS ANGELES, CALIFORNIA

SAFETY THROTTLE CONTROL

Application filed May 19, 1928. Serial No. 279,083.

This invention relates to throttle controls and, more particularly, to throttle controls that are operated by a foot of the driver of the automobile of which the motive fluid is to be controlled.

It is customary to provide a foot operated lever on automobiles, the same being connected with the throttle valve of the carburetor so that the driver of the automobile can regulate the speed or power of the motor with the action of his foot while steering and shifting gears with his hands. Since one of the brakes is also operated by the driver's foot, the foot throttle control lever is generally positioned rather close to the foot brake lever so that the foot can be quickly shifted from the foot operated throttle lever to the foot brake lever, and vice versa. In this position of the foot throttle lever in proximity to the foot brake lever, there is danger of the driver putting his foot on the foot throttle lever, generally termed "accelerator", when he is under the impression that he is placing his foot on the brake lever.
This unpremeditated operation of the accelerator has produced a large number of serious accidents. A further cause of accidents owing to this unpremeditated actuation of the accelerator is due to the driver's foot, when depressing the foot brake lever, projecting laterally from said lever sufficiently to also engage and depress the accelerator.

A very important object of the present invention is safety in the operation of motor vehicles.

Another important object is simplicity and inexpensiveness of construction.

Another important object is dependability.

Further objects and advantages will appear in the subjoined detailed description.

Figure 1:
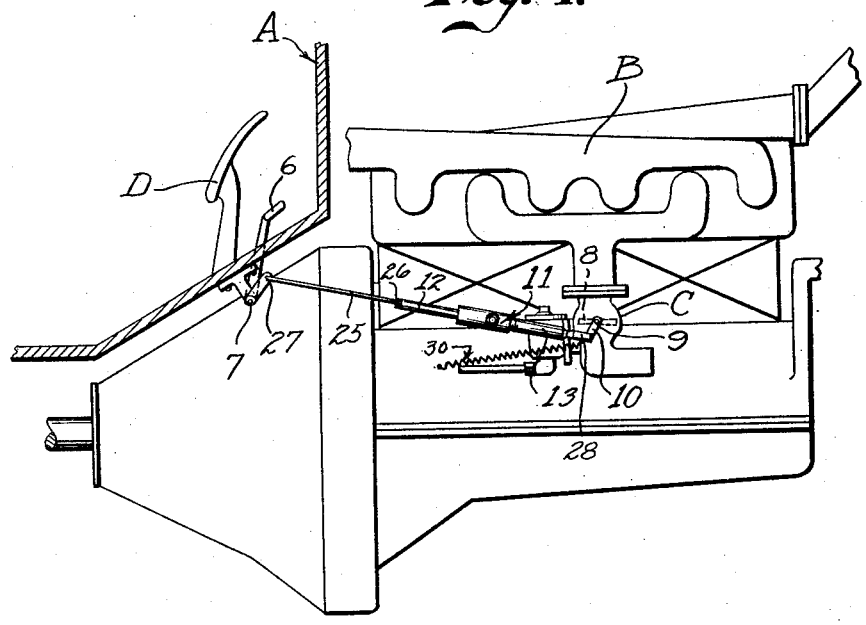
Figure 2:
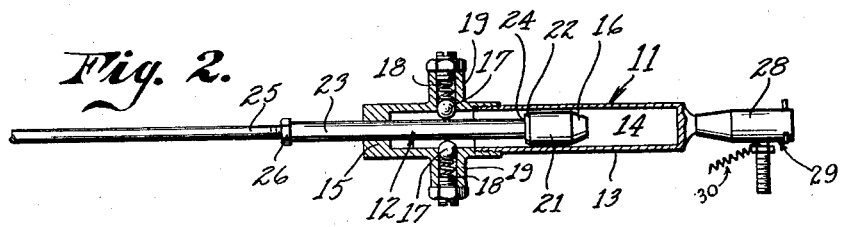

The accompanying drawings illustrate the invention:

Fig. 1 is a side elevation of a safety throttle control constructed in accordance with the provisions of this invention and connected with the throttle of an internal combustion engine that constitutes a portion of a motor vehicle which is fragmentarily shown. The foot operated brake lever is also shown.
Fig. 2 is an enlarged longitudinal view, partly in section, of the throttle control shown in Fig. 1. The operating rod is in the collapsed condition.

Figure 3:
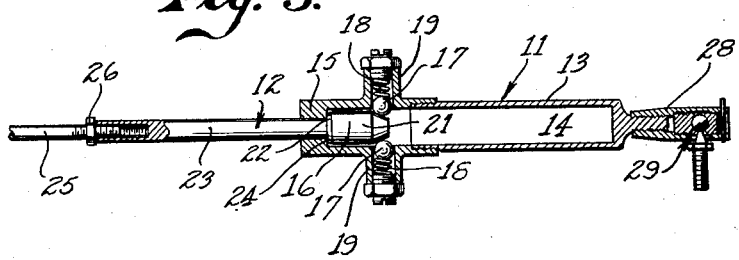

Fig. 3 is a sectional view, similar to Fig. 2, showing the operating rod in the extended condition.

An automobile is fragmentarily indicated at A and comprises an internal combustion motor B provided with a carburetor C. The automobile is provided with the usual foot operated brake lever D and with a throttle control lever, or accelerator, 6. The fulcrum for the accelerator 6 is indicated at 7. The throttle valve of the carburetor C is indicated in dotted lines at 8 in Fig. 1, which in common practice is operative through about 90 degrees of opening and is moved therethrough from a stop constituting a minimum opening for idling loads to a stop permitting maximum opening for full loads. Such stops are provided for all known makes of carburetors and are required for the correct operation of internal combustion engines using a carburetted air mixture, said stops generally comprising abutments cast on the carburetor body which is, in effect, part of the engine intake pipe. The pivot, or shaft, of the throttle valve is indicated at 9, and said pivot is provided with the usual operating arm 10. Connecting the throttle operating arm 10 with the accelerator 6 is a collapsible means, indicated in general by the character 11. The collapsible means 11 includes a resilient element that provides a given amount of tension for holding the rod 11 in extended condition when the pressure exerted on the accelerator does not exceed a predetermined amount and, when the pressure on said accelerator does exceed a predetermined amount, the resilient element yields, thus permitting collapse of the operating rod.

It is to be understood that the collapsible means 11 may be of any suitable construction and that the collapsible means illustrated in the drawings and hereinafter described is only that which is at present the preferred embodiment of said means. Accordingly, the collapsible means illustrated is constructed as follows:

The collapsible means 11 comprises a sectional rod. Two of the rod sections are indicated at 12, 13 and are in telescopic relation, the section 12 telescoping inside of the section 13 which, accordingly, is provided with a bore 14 to receive the section 12. The section 12 slides through a bearing 15 at one end of the section 13, and the inner end of the section 12 constitutes an abutment, or shoulder, 16 adapted, when the sections 12, 13 are relatively positioned as in Fig. 3, to be engaged by a detent, or detents, 17 which, in this instance, are of the ball type. The detents 17 are urged inwardly by coil springs 18 mounted in spring chambers 19 formed in the section 13. The springs 18 may be of any desired tension or expansive force. The abutment 16 is tapered or reduced toward the inner end of the rod section 12 so that the detents 17 will ride over the abutment on to the straight cylindrical portion 21 of the rod section 12.

In order that the rod section 12 may be readily extended from the collapsed condition shown in Fig. 2 to the extended condition shown in Fig. 3, the section 12 is provided with a tapered shoulder 22 that joins the straight cylindrical portion 21. The smaller end of the shoulder 22 is of greater diameter than the main body 23 of the rod section 12 so as to form a shoulder 24 at right angles to the axis of the rod portion 23 in order that the shoulder 24 will stop against the inner end of the bearing 15 when the sections 12, 13 are in their extended positions, as in Fig. 3. Thus there will be no looseness between the sections 12, 13 when thus extended and, furthermore, the provision of the shoulder 24 prevents wear between the shoulder 22 and the wall surface of the bore of the bearing 15. The shoulders 16, 22 and the straight portion 21 together constitute a head that is of larger diameter than the rod portion 23.

The rod section 12 may be made up of any desired number of parts and, in the present instance, a rod portion 25 is screwed at one end into the rod portion 23, and a jamb nut 26 is threaded on to the rod portion 25 against the outer end of the rod portion 23. The rod portion 25 pivotally connects at 27 with the accelerator 6, in a manner well understood in this art. The rod section 13 is connected in any suitable manner with the arm 10 and, in this instance, said rod portion 13 is screw-threaded into one end of a sleeve 28 of the well-known type of ball and socket connection which is indicated in general by the character 29. The ball and socket connection 29 is secured to the arm 10.

When the invention is installed on a motor vehicle in the manner illustrated in the drawings and above described, the operation is as follows:

To govern the speed or power of the motor B, the driver depresses, more or less, the accelerator 6 and, the rod 11 being in the extended condition, said rod follows the movements of the accelerator so as to open and close the throttle valve in a manner well understood in this art. Now, assuming that it becomes necessary for the driver to quickly apply the brakes, not shown, of the motor vehicle and that, because of his excitement, or for some other reason, he kicks down on the accelerator 6 instead of the brake pedal D, the pressure thus applied to the accelerator being in excess of the pressure of the detents against the shoulder 16, said detents will yield, because throttle 8 will be thrown open against its stop and the tension of spring 30, thus permitting rod 11 to collapse and throttle 8 to be immediately snapped closed by the action of spring 30. In this manner acceleration of the vehicle is prevented and disaster avoided. When the rod 11 thus collapses, the resistance against the pressure of the driver's foot will suddenly cease, and thus warn him that he has depressed the accelerator instead of, as was his intention, the brake pedal and he will quickly remove his foot from the accelerator and apply it to the brake pedal, so as to, as quickly as possible, bring the motor vehicle to a stop.

Thus the sudden collapsing of rod 11 is due to a pressure induced by the speed of application of such pressure when the driver suddenly kicks down on the accelerator 6. This is better understood by stating that there is a normal speed of the foot for normally accelerating motor B and an abnormal speed, such as described under the influence of a driver's excitement, etc., when acceleration is not desired.

Under the latter condition the power delivered by the driver's foot is greatly magnified and my invention is primarily directed to operation under conditions of abnormal application of power.

Under the described operation, therefore, upon abnormal application of power by the driver to accelerator 6, throttle 8 will be momentarily thrown to an open position against its stop and tension of spring 30, whereupon rod 11 will collapse and throttle 8 will then be immediately snapped closed by the action of spring 30 to its closed or idling position.

However, due to the speed of application of such abnormal power by the driver, the momentary opening of throttle 8 under such conditions is absolutely ineffective for accelerating motor B and is, in fact, unnoticeable.

When the driver desires to again properly control the operation of the motor, after collapse of the control means, it is only necessary that he exert a pull on the upper end of the accelerator 6, thus drawing the rod section 12 into the extended position.

A spring 30, anchored at one end to the motor and having its other end connected with the connection 29, serves to retract the means 11 so as to close the throttle valve 8.

I claim:

1. The combination with an automobile motor provided with a throttle valve and with an arm to operate said valve, of an accelerator, and a collapsible means connecting the arm and the accelerator, said collapsible means including a tension member yieldingly holding the collapsible means against collapsing, said tension member yielding when pressures above a predetermined amount are applied to the accelerator.

2. The combination of: a vehicle, an internal combustion engine mounted in the vehicle for driving the same, a carburetor attached to the engine, a throttle in the carburetor for governing the speed of the vehicle, a spring normally holding the throttle closed, an accelerator, and collapsible means connecting the accelerator and throttle.

3. A safety throttle rod for a motor driven vehicle comprising a hollow section, a rod section, and tension means adapted to hold the two sections in relatively fixed position; said rod section having a head beveled on each end slidably fitting the bore of the hollow section.

4. A safety throttle rod for a motor driven vehicle comprising: a hollow section, a rod section having a beveled head slidably fitting the bore of the hollow section, and tension means adapted to hold the two sections in relatively fixed position; said head being held between said tension means and one end of the hollow section with substantially no lost motion.

Signed at Los Angeles, Calif., this 11th day of May, 1928.

FRANK VAN VRANKEN.